US012269322B2

(12) United States Patent
Lewis et al.

(10) Patent No.: US 12,269,322 B2
(45) Date of Patent: *Apr. 8, 2025

(54) HARD SUPPORT CORNER FOR A SOFT TOP

(71) Applicant: Bestop, Inc., Louisville, CO (US)

(72) Inventors: Stephen J. Lewis, Harrison Township, MI (US); Charles C. Turney, Toledo, OH (US); Jonathon G. Moore, Chesterfield, MI (US); Duane C. Junkin, Madison Heights, MI (US)

(73) Assignee: Bestop, Inc., Louisville, CO (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/845,467

(22) Filed: Jun. 21, 2022

(65) Prior Publication Data

US 2022/0314752 A1 Oct. 6, 2022

Related U.S. Application Data

(63) Continuation of application No. 17/557,315, filed on Dec. 21, 2021, now Pat. No. 11,413,940, which is a continuation of application No. 17/353,247, filed on Jun. 21, 2021, now Pat. No. 11,338,650, which is a continuation of application No. 16/729,850, filed on Dec. 30, 2019, now Pat. No. 11,180,004, which is a continuation of application No. 15/614,028, filed on Jun. 5, 2017, now Pat. No. 10,556,489.

(Continued)

(51) Int. Cl.
*B60J 1/08* (2006.01)
*B60J 1/00* (2006.01)
*B60J 7/10* (2006.01)
*B60J 7/11* (2006.01)
*B60J 7/12* (2006.01)

(52) U.S. Cl.
CPC ............... *B60J 1/085* (2013.01); *B60J 1/006* (2013.01); *B60J 7/10* (2013.01); *B60J 7/11* (2013.01); *B60J 7/1226* (2013.01)

(58) Field of Classification Search
CPC ..... B60J 1/085; B60J 1/006; B60J 7/10; B60J 7/11; B60J 7/1226
USPC ........................................................ 296/201
See application file for complete search history.

(56) References Cited

U.S. PATENT DOCUMENTS 6,827,391 B1  12/2004  Kohn et al.
6,851,739 B2   2/2005  Morley
(Continued)

FOREIGN PATENT DOCUMENTS

JP      H06106989 A    4/1994

OTHER PUBLICATIONS

International Search Report for PCT/US2017/035956 dated Sep. 27, 2017 (3-pages).

*Primary Examiner* — Amy R Weisberg
*Assistant Examiner* — Dana D Ivey
(74) *Attorney, Agent, or Firm* — Warn Partners, P.C.

(57) ABSTRACT

A quarter window assembly for a soft top cover assembly that is removable. The quarter window assembly is connectable to the soft cover assembly. The quarter window assembly has a hard corner assembly mountable to features connected to a vehicle. The hard corner assembly is an injection molded plastic assembly. The quarter window assembly also has a panel carrying at least one window, and the panel is secured to the hard corner assembly.

13 Claims, 11 Drawing Sheets

Related U.S. Application Data

(60) Provisional application No. 62/345,347, filed on Jun. 3, 2016.

(56) References Cited

U.S. PATENT DOCUMENTS

| | | | | |
|---|---|---|---|---|
| 7,240,960 | B2* | 7/2007 | Fallis, III | B60J 7/1291 |
| | | | | 296/218 |
| 10,556,489 | B2* | 2/2020 | Lewis | B60J 7/11 |
| 11,180,004 | B2* | 11/2021 | Lewis | B60J 7/11 |
| 2003/0168880 | A1* | 9/2003 | Burkel | B60J 7/106 |
| | | | | 296/103 |
| 2003/0193211 | A1 | 10/2003 | Neubrand | |
| 2005/0134096 | A1 | 6/2005 | Fallis, III et al. | |
| 2014/0138983 | A1* | 5/2014 | Haberkamp | B60J 5/101 |
| | | | | 296/107.09 |
| 2014/0284959 | A1* | 9/2014 | Hanson | B60J 1/004 |
| | | | | 296/107.07 |

* cited by examiner

HARD SUPPORT CORNER FOR A SOFT TOP

CROSS-REFERENCE TO RELATED APPLICATIONS

The instant application is a continuation of U.S. patent application Ser. No. 17/557,315, filed Dec. 21, 2021, which is a continuation of U.S. patent application Ser. No. 17/353,247, filed Jun. 21, 2021, now U.S. Pat. No. 11,338,650, issued May 24, 2022, which is a continuation of U.S. patent application Ser. No. 16/729,850, filed Dec. 30, 2019, now U.S. Pat. No. 11,180,004, issued Nov. 23, 2021, which is a continuation of U.S. patent application Ser. No. 15/614,028, filed Jun. 5, 2017, now U.S. Pat. No. 10,556,489, issued Feb. 11, 2020, which claims the benefit of U.S. Provisional Application No. 62/345,347, filed Jun. 3, 2016. The disclosures of the above applications are incorporated herein by reference.

FIELD OF THE INVENTION

The present invention relates to a removable window assembly for a soft top with a corner attachment for connecting to a vehicle.

BACKGROUND OF THE INVENTION

Soft tops such as foldable/stowable roof tops for sport utility (SUV) type vehicles are desired. Typical soft top systems include at least one top deck (forming the roof) and a plurality of windows that are openable or entirely removable (front windows, rear windows, back window, and/or quarter windows). One typical window is the rear quarter window on the right and left sides of the vehicle. These windows are removable when it is desired to have a more open feel. There are several methods for providing an attachment for the rear quarter windows. However, conventional windows are difficult to align into position and to close.

One of these methods is a zipper to attach the rear quarter window to the soft top surround. These zippers are notoriously difficult and prone to misalignment, which makes them difficult to use (high zipping effort) and can also leave gaps between zipper halves exposing the vehicle interior to environmental elements. Another known methods incorporate zippers and trim features. Again, these cause installation issues and are difficult to use. Typical windows also lack structure and positive attachment features making handling and alignment of the window difficult during installation.

Therefore, there remains a need in the art for a removable window that eliminates zippers and includes structural support and attachment features for effective and easy installation to the vehicle.

SUMMARY OF THE INVENTION

The present invention is directed to a quarter window assembly for a soft top cover assembly that is removable and provides a hard corner support. The quarter window assembly has an mountable corner portion that is a multi-piece injection molded plastic assembly operably mountable to a vehicle. The quarter window assembly also has a panel with at least one window, the panel being operably secured to the mountable corner assembly. The quarter window assembly is removably connected to a soft top assembly surround, such as to a sliding/folding soft top assembly for 4-door and 2-door SUVs, sliding/folding slanted back soft top assembly for 4-door and 2-door SUVs or modified for use with any other soft top assembly of any kind.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
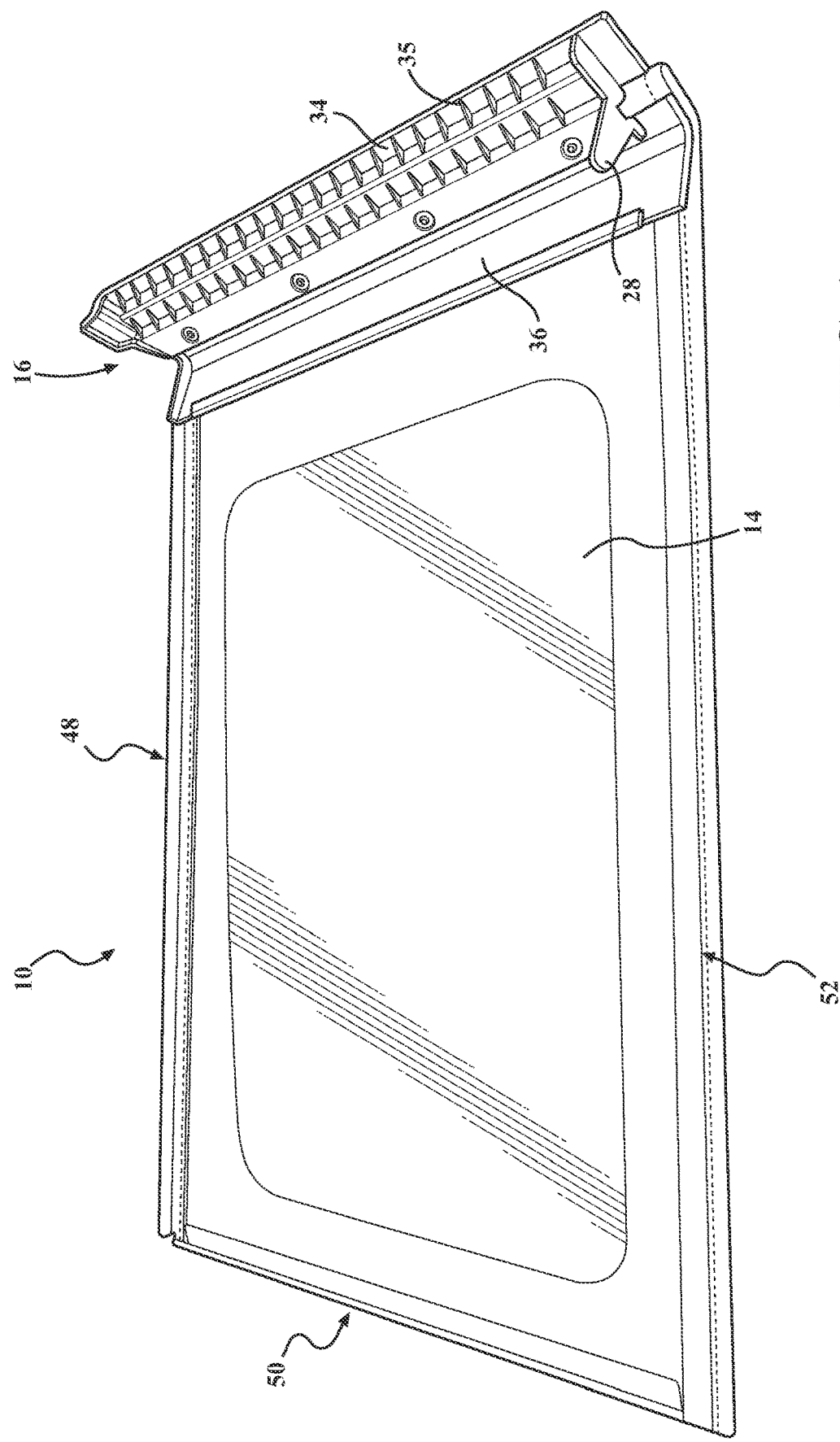
FIG. 1 is a perspective view of a quarter window assembly, in accordance with the present invention.

The following description of the preferred embodiment(s) is merely exemplary in nature and is in no way intended to limit the invention, its application, or uses.

Referring to the figures generally, the present invention provides a quarter window assembly for a soft top assembly, e.g., rear RH/LH quarter window assemblies (for a sliding/folding soft top for a 4-door or 2-door SUV, a folding soft top cover assembly (for a sunroof feel), soft top assembly with lift assist for a 4-door or 2-door SUV, a removable soft top assembly, a sliding/folding slanted back soft top assembly for 4-door or 2-door SUVs (the soft top assembly having a slant back window area feature), or any other soft top cover assembly of any kind for a vehicle depending on the application).

Referring to FIGS. 1-11 generally, according to the present invention, there is provided a quarter window assembly shown generally at 10 having at least one panel portion, shown generally at 12, with at least one window 14 and at least one mountable corner assembly, shown generally at 16, or "hard corner portion", which is typically injection molded, preferably, that is a multi-piece injection molded plastic assembly, most preferably, that is a hard corner two piece injection molded plastic assembly.

FIGS. 7-11 depict the quarter window assembly 10 installed on a vehicle 2 with mounting features generally representative of the vehicle, e.g., 4-door Jeep™ type. FIGS. 3-6 also depict the quarter window assembly 10 installed, however, with the panel portion 12 omitted to more clearly show the hard corner portion 16 connected to vehicle attachment features. A cover 18 or "top deck" of a soft top assembly shown generally at 20 provides a roof and is generally positioned to cover the upper edge of the quarter window assembly 10, as will be explained in greater detail below.

Figure 5:
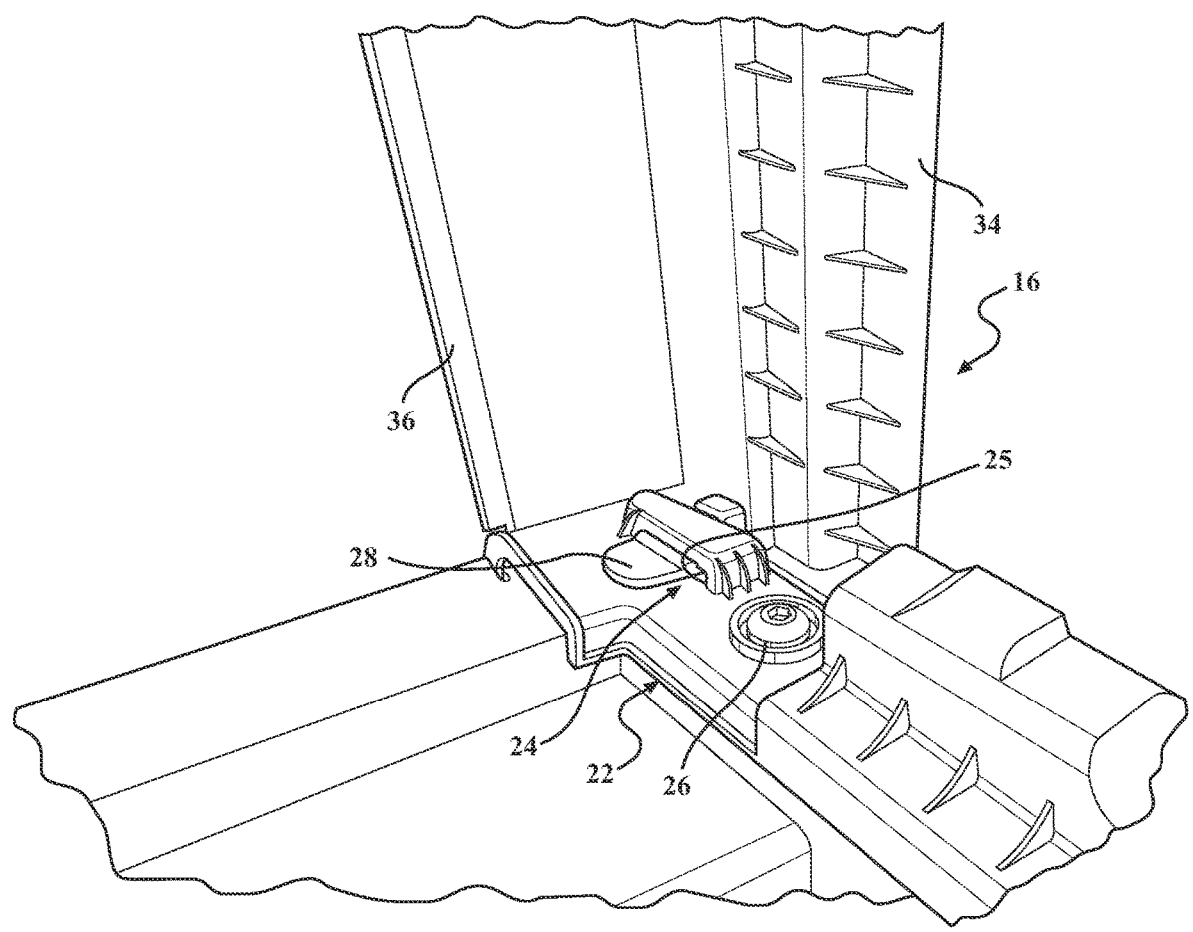
FIG. 5 is an enlarged front perspective view of a lower portion of the mountable corner portion depicted in FIG. 4 shown attached to a tailgate bar receiver on the vehicle, in accordance with the present invention.

The hard corner portion 16 is positioned generally vertically at the rear corner of the vehicle. The upper end and lower end of the hard corner portion 16 is operably attached to the vehicle and allows for selectively removing the hard corner portion 16 for maintenance, replacement, repair or when a more open air feel/driving experience is desired. As best shown in FIG. 5, in one embodiment, a tailgate bar receiver shown generally at 22 is provided (e.g., as a single or multiple piece original manufacturer component(s) or as add-on feature(s)) with at least one retention member generally shown at 24, e.g., clip ridge feature, and is operably mounted to the vehicle with at least one fastener 26 to receive at least one corresponding feature provided on the hard corner portion 16. Typically, the tailgate bar receiver 22 is located in a fixed position on the vehicle rear body panel adjacent to the tailgate of the vehicle (does not move with the tailgate). Preferably, the retention member 24 is at least one raised piece with at least one elongated opening 25 to accept a respective locking feature 28, e.g., flexible clip, of the hard corner portion 16. Preferably, the locking feature 28 is integrally formed toward the bottom edge of the hard corner portion 16. The locking feature 28 is a snap fit in the opening 25 to prevent the locking feature 28 from moving laterally out of the receiver 24. However, the locking feature 28 is somewhat flexible for selectively forcing in a direction for removal such that a protrusion or ramp on the locking feature can back out of the opening 25. The hard corner portion 16 is removable for maintenance, replacement or when a more open air feel is desired (e.g., to replace/repair the hard corner 16 and/or to replace/repair the panel portion 12). Alternative and additional corresponding mounting features are contemplated without departing from the scope of the present invention.

Figure 6:
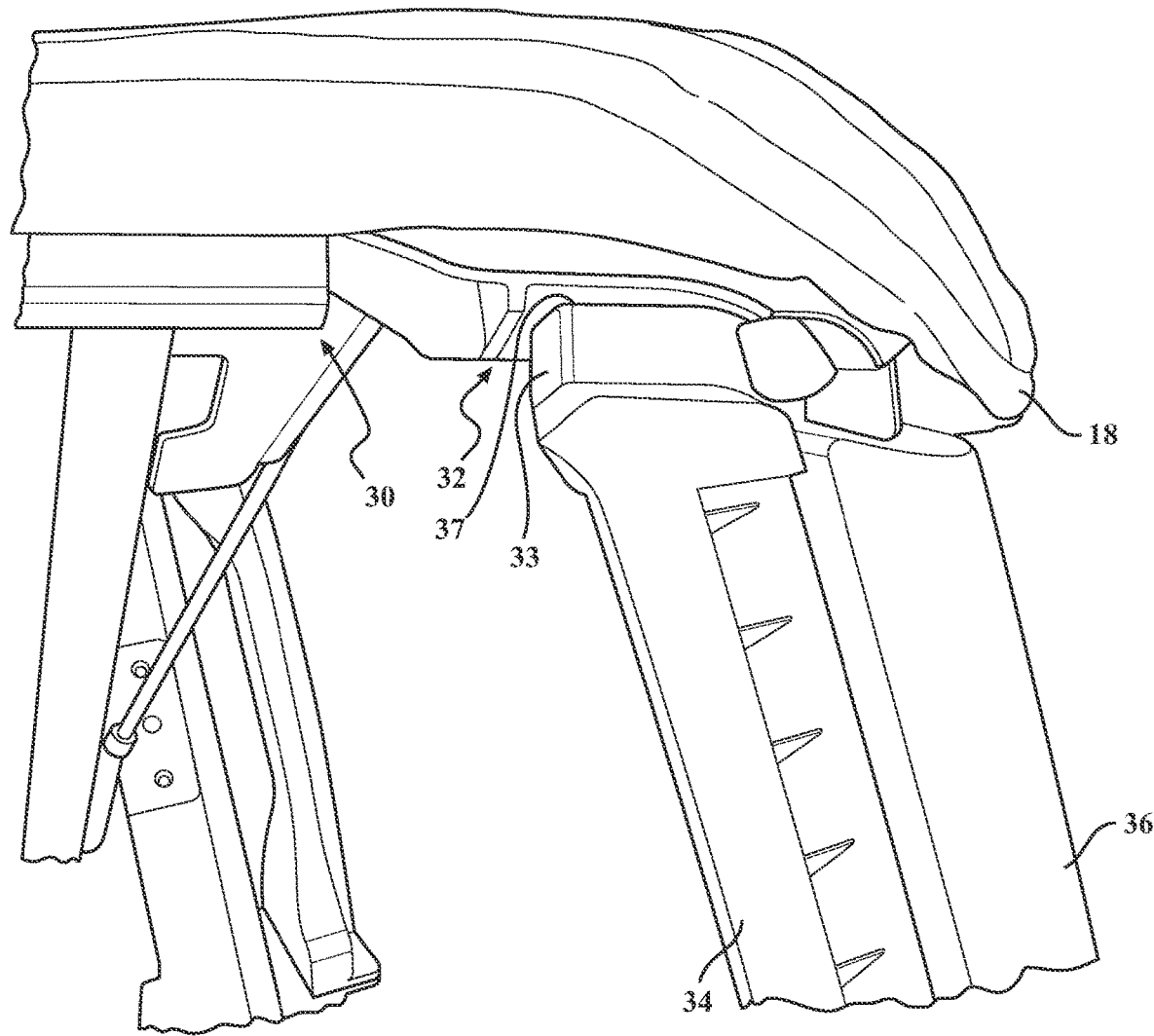
FIG. 6 is an enlarged rear perspective view of the upper portion of the mountable corner depicted in FIG. 4 shown attached to a bow end bracket feature of a soft top assembly, in accordance with the present invention.
Figure 7:
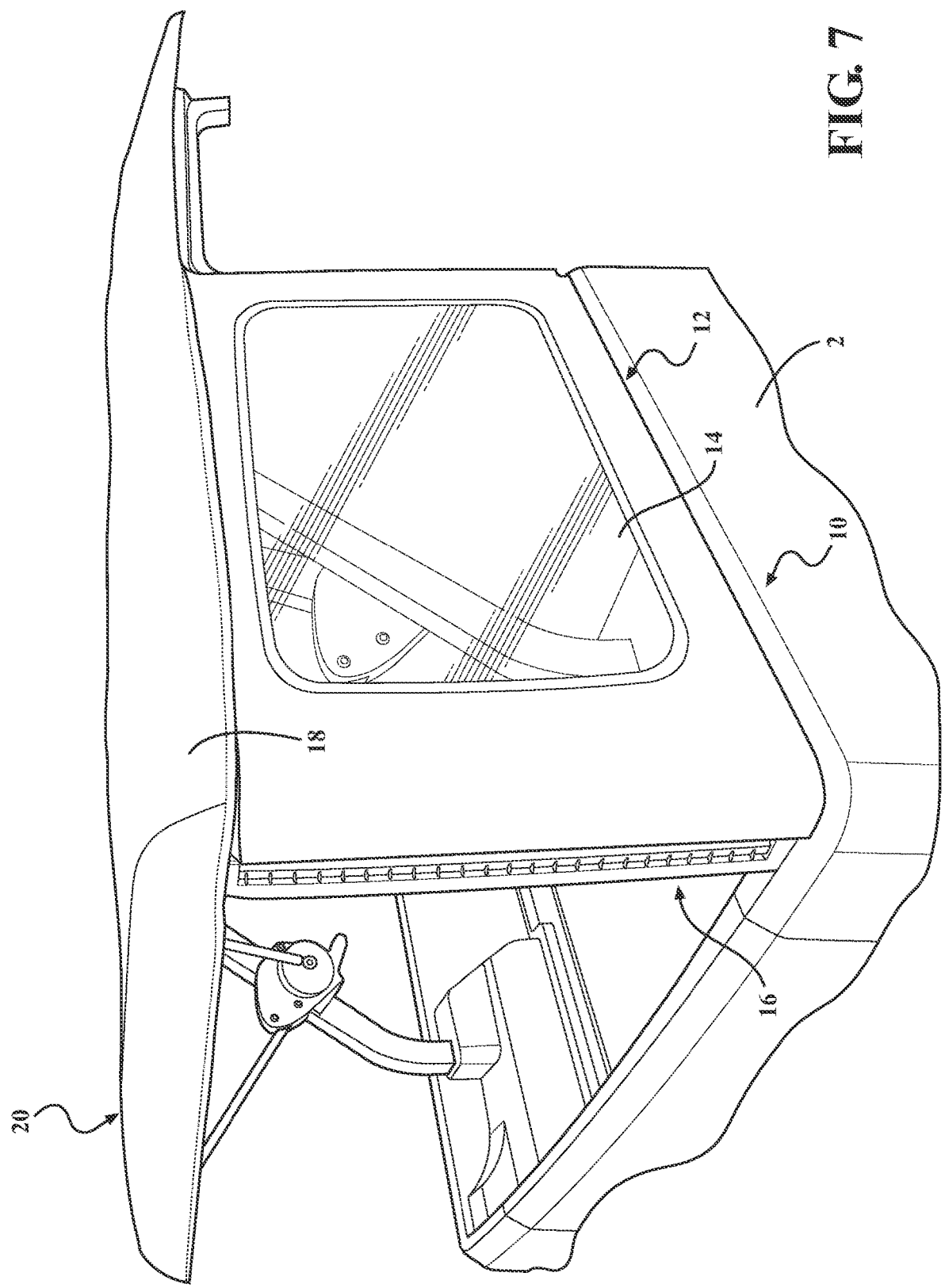
FIG. 7 is a right side rear perspective view of the quarter window assembly shown installed on a vehicle, in accordance with the present invention
Figure 8:
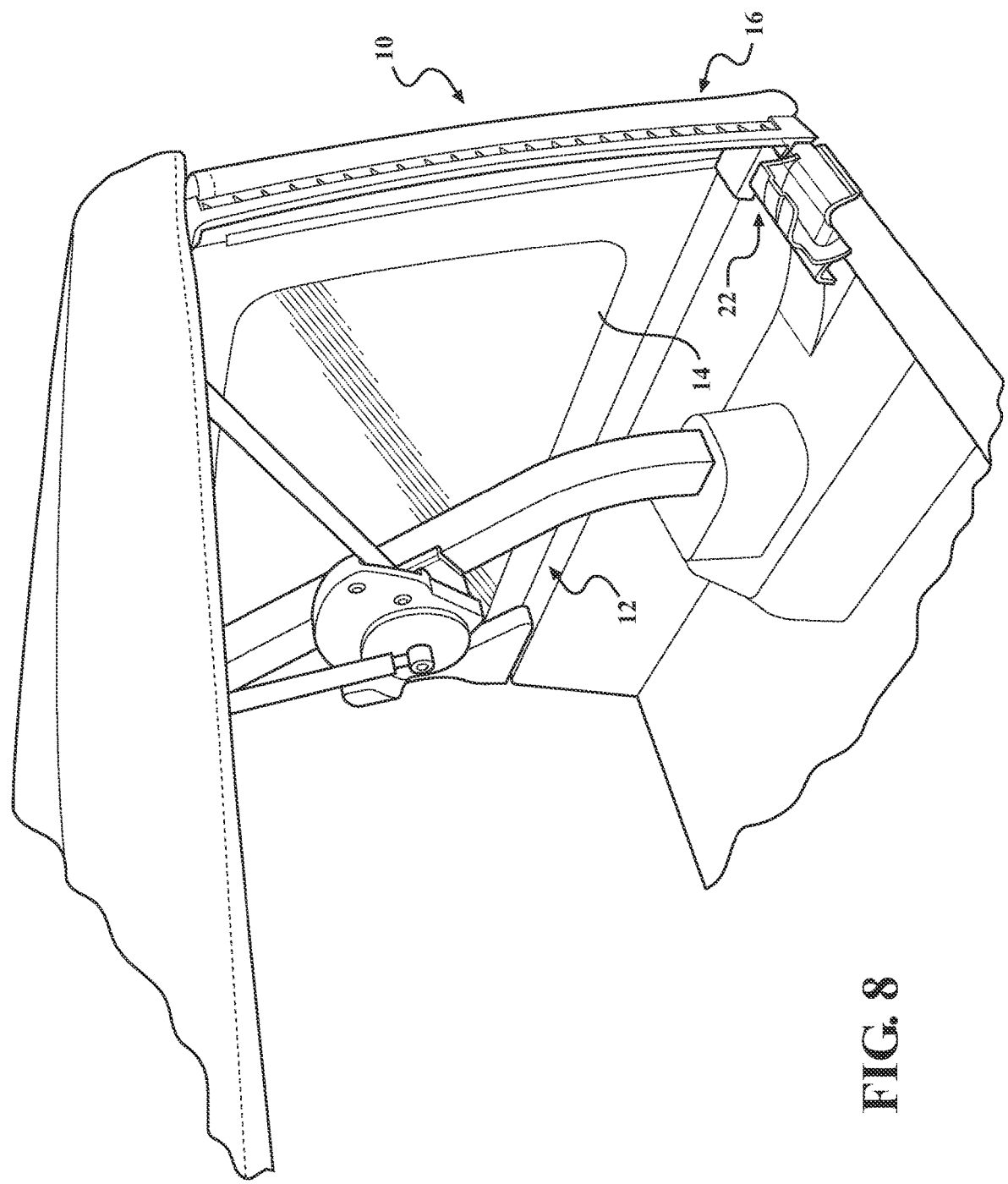
FIG. 8 is a left side rear perspective view of the quarter window assembly of FIG. 7 shown installed on a vehicle, according to the present invention.
Figure 9:
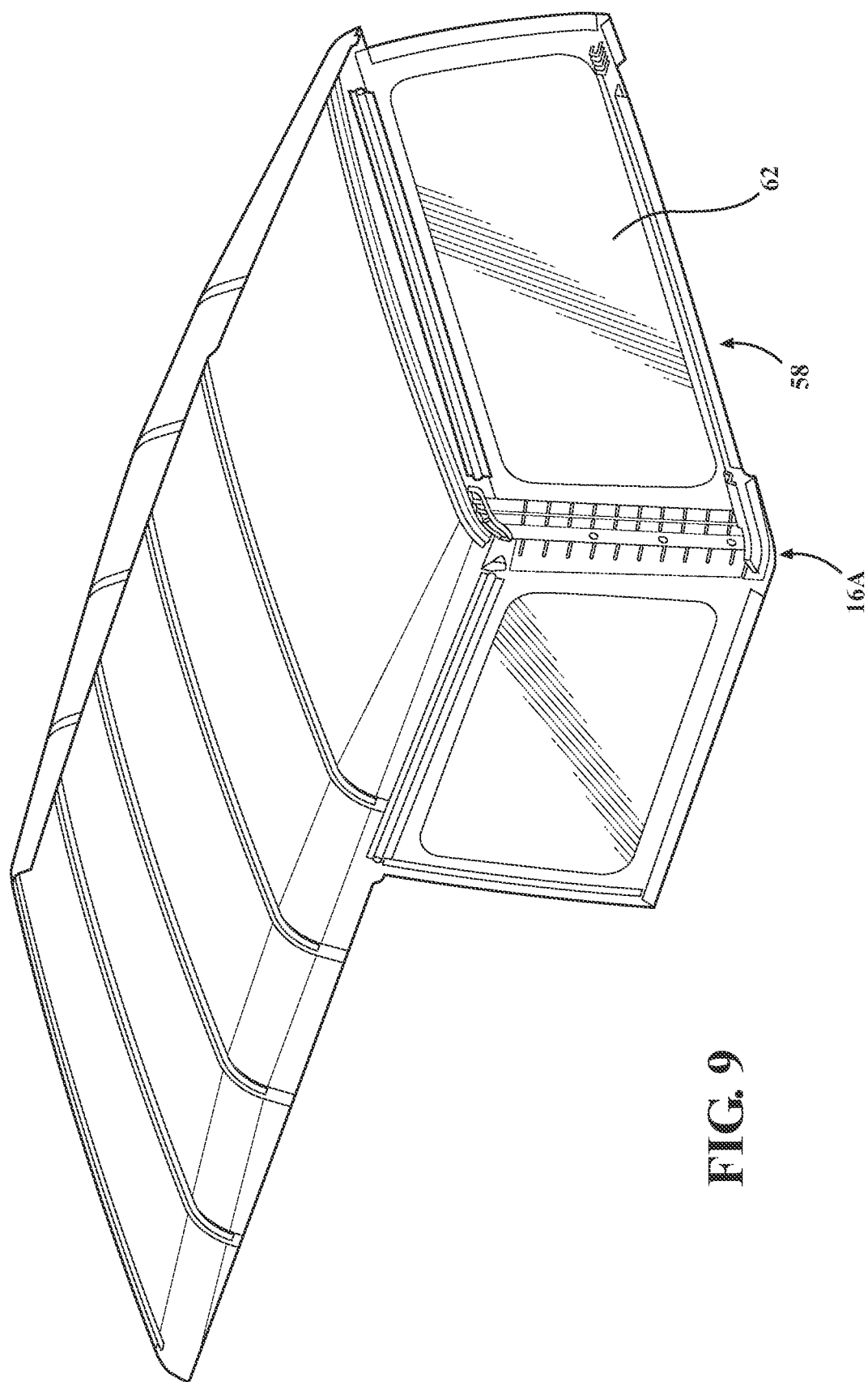
FIG. 9 is a rear left hand perspective broken-away view of a soft top assembly incorporating right hand and left hand quarter window assemblies and a rear window assembly, with portions of panel material and top deck material removed for clarity, according to an embodiment of the present invention.
Figure 10:
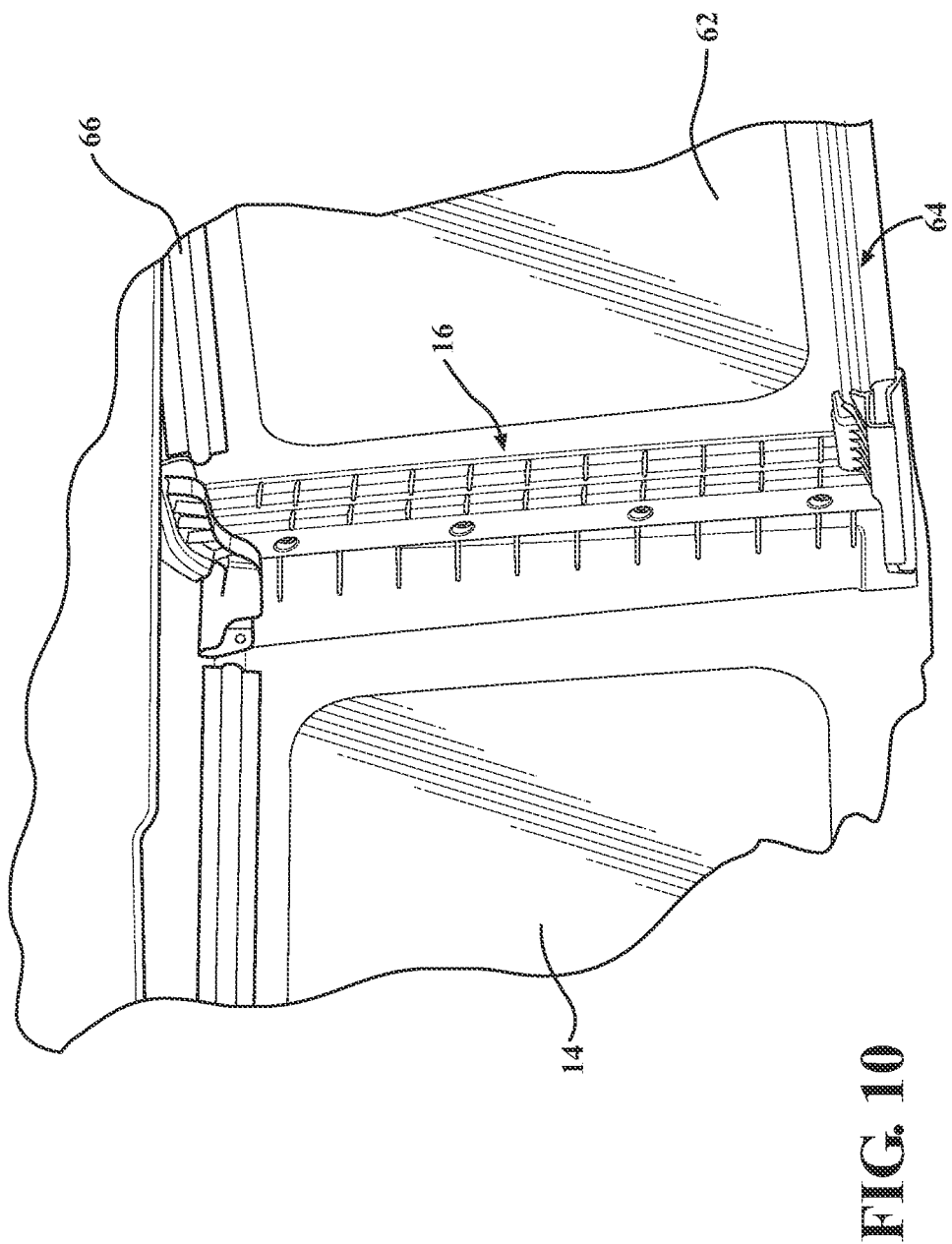
FIG. 10 is a front perspective view of the quarter window assembly and a rear window assembly from within the vehicle, with portions of a top deck removed for clarity, according to the present invention; and, FIG. 11 is a rear right hand perspective view of the soft top assembly incorporating the quarter window assembly, in accordance with an embodiment of the present invention.
Figure 11:
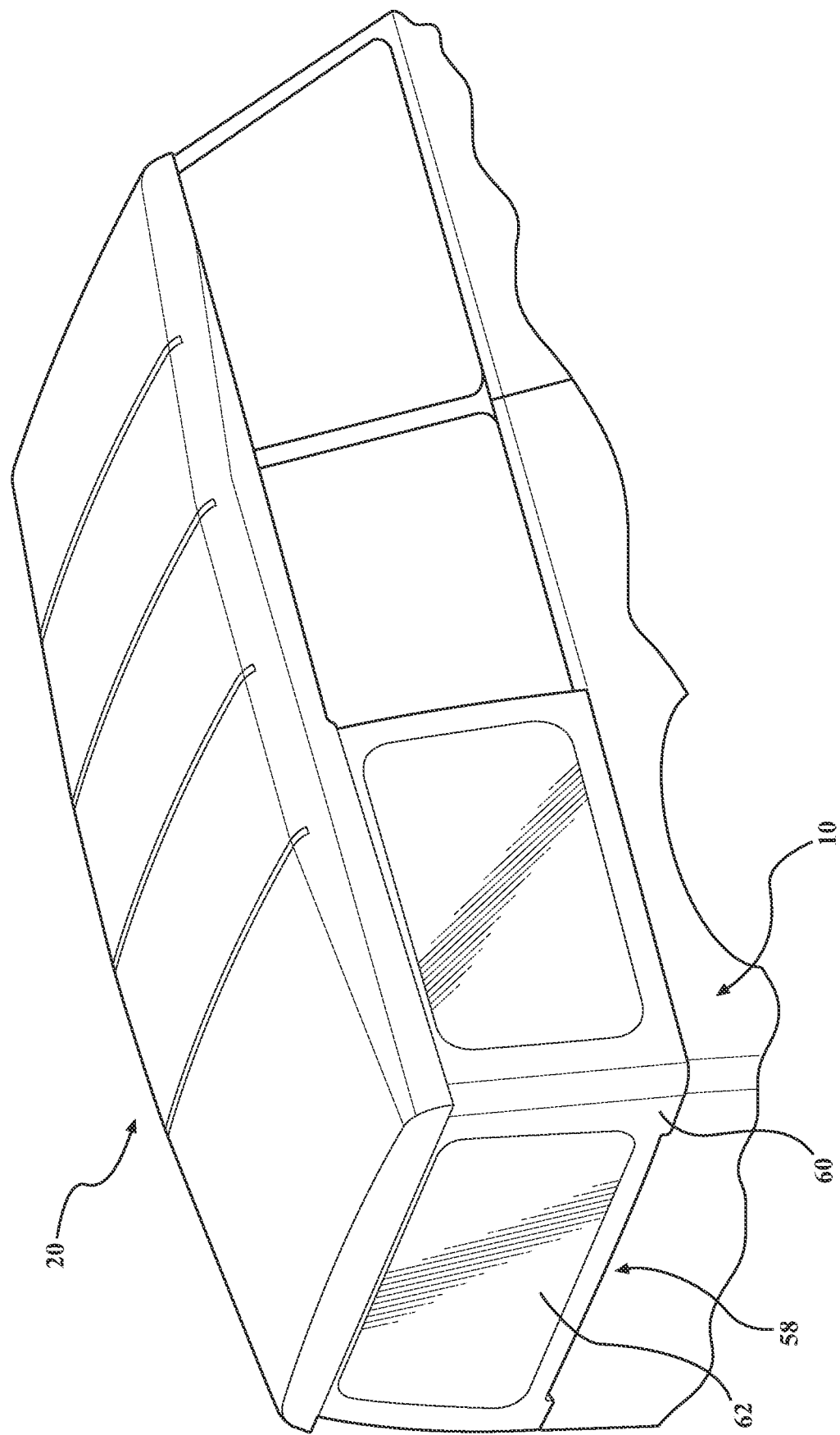

In one embodiment, the soft top assembly 10 is provided with a rear bow shown generally at 30 (e.g., see FIG. 6). A bracket shown generally at 32, e.g., cast aluminum bow end bracket, is operably connected to the rear bow 30 or, alternatively, to the vehicle, and the bracket 32 is suitable to receive at least one corresponding attachment feature 33 provided on the hard corner portion 16. Typically, the corresponding attachment feature 33 is integrally formed (e.g., see FIG. 2) with or connected toward the upper edge of the hard corner portion 16. Preferably, the bracket 32 includes an aperture 37, slot or other opening to receive the attachment feature 33, which attachment feature 33 is integrally formed at the upper edge of a first part 34 of the hard corner portion 16. Alternative and additional corresponding mounting features are contemplated without departing from the scope of the present invention. At least one fastener secures the attachment feature 33 to the bracket 32, according to an embodiment of the present invention.

The hard corner support 16 mounting is a highly desirable attachment method that is fast, easy and effective—unlike conventional systems.

Figure 2:
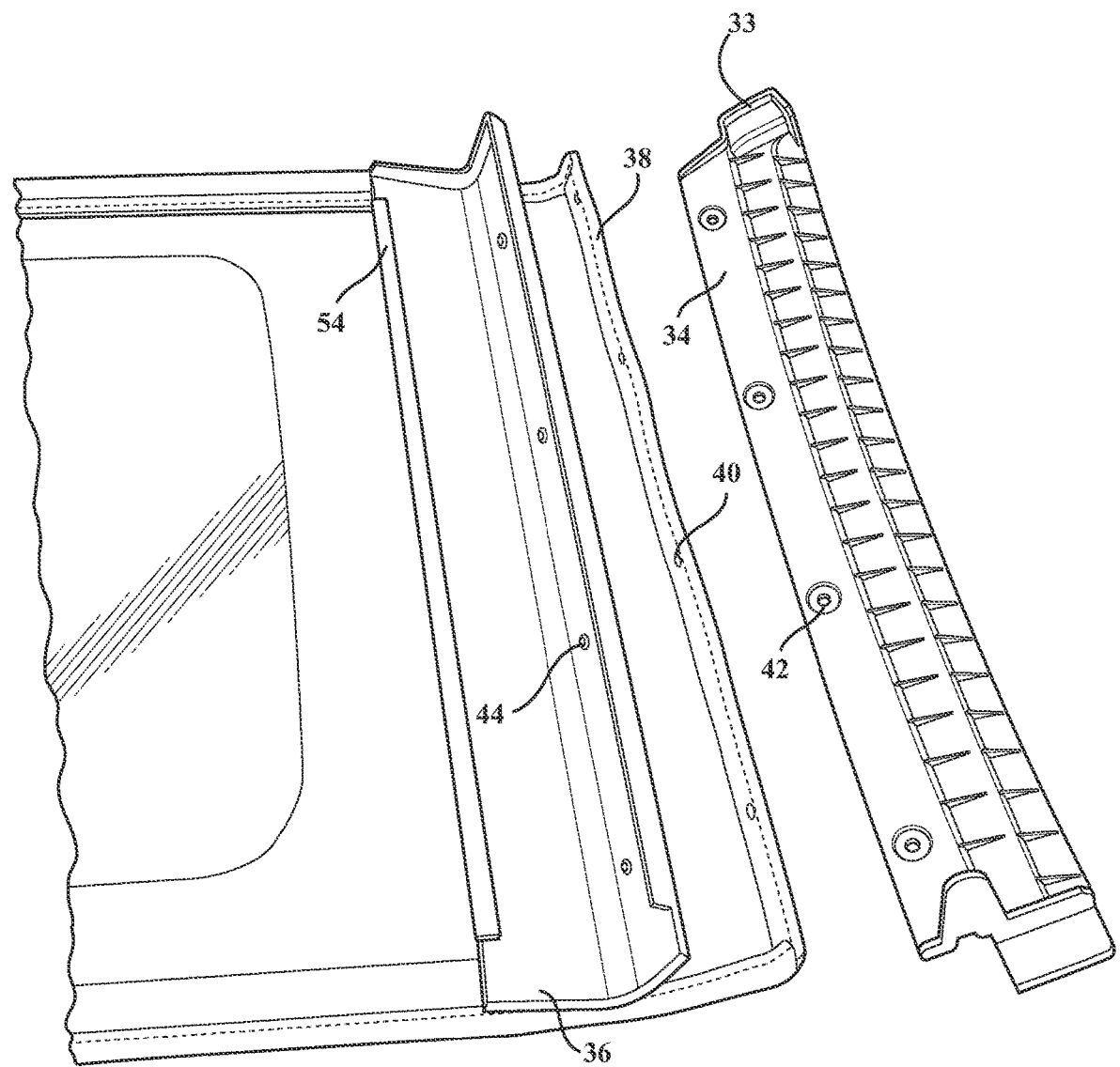
FIG. 2 is partial exploded view of the quarter window assembly of FIG. 1, according to the present invention.
Figure 3:
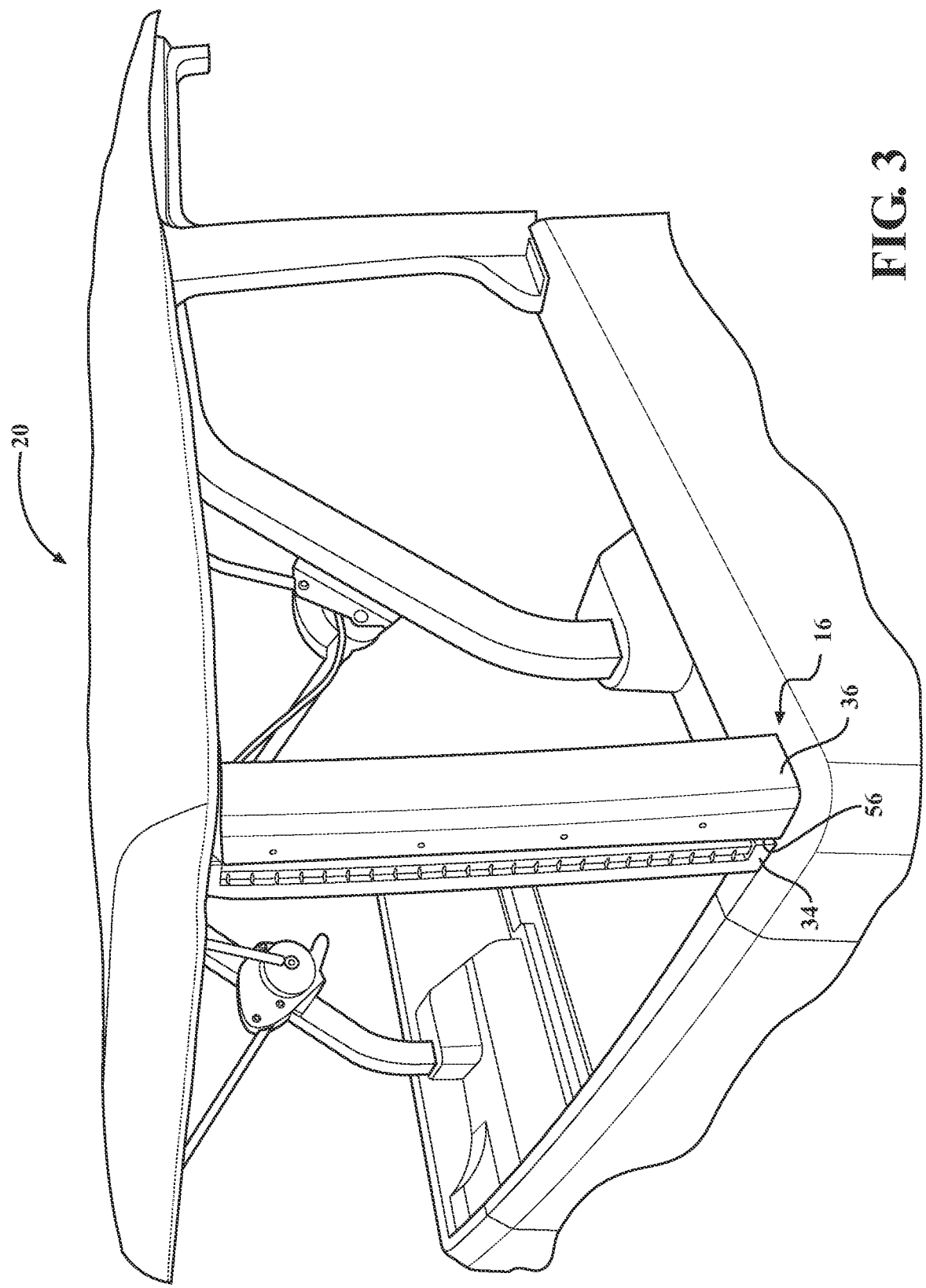
FIG. 3 is a right side rear perspective view of a mountable corner portion of the quarter window assembly of FIG. 1 shown installed on a vehicle, according to the present invention.
Figure 4:
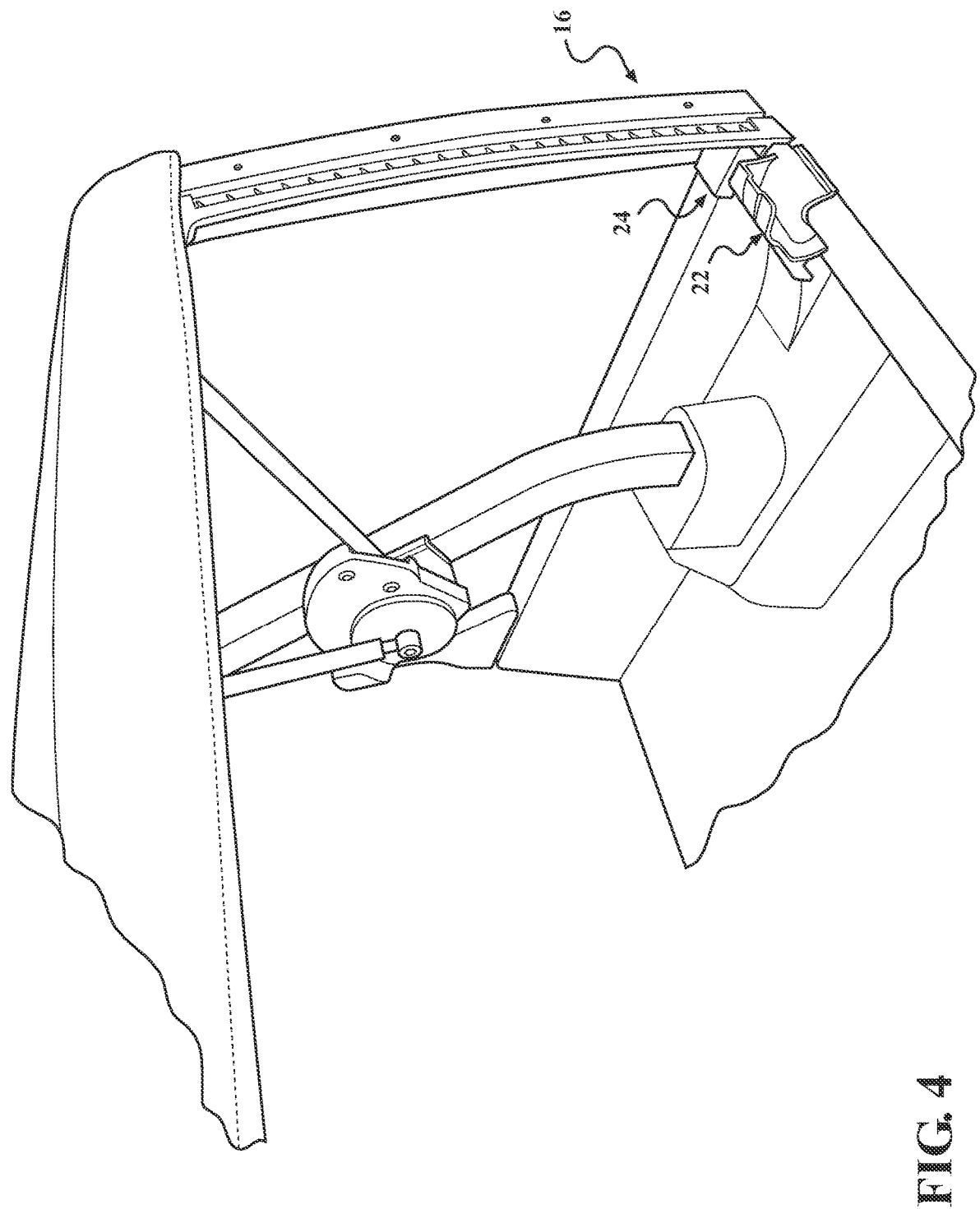
FIG. 4 is a left side rear perspective view of the mountable corner portion of the quarter window assembly of FIG. 3 shown installed on the vehicle, according to the present invention.

Referring more particularly to FIGS. 1-2, the hard corner portion 16 has at least the first part 34 and a second part 36, in a preferred embodiment. Typically, the first and second parts 34,36 are injection molded pieces. Rows of transverse ribs 35 on at least the first part 34 provide additional strength. The panel portion 12 is connected to the hard corner portion. A rear window is selectively connected to the hard corner portion 16. When a more open air feel is desired, the quarter window assembly 10 and/or rear window is/are removed.

The panel portion 12 of the quarter window assembly 10 is connected to the hard corner support 16. In a preferred embodiment, the material at the rearward end 38 of the panel 12 is held between at least the first part 34 and the second part 36. In this embodiment, a plurality of holes 40 are provided along the rearward edge 38 of the material that each align with a respective one of a plurality of first apertures 42 and plurality of second apertures 44 provided in the first part 34 and second part 36, respectively, and is secured in place by a plurality of fasteners 46, e.g., screws, bolts, rivets, at least four screws, etc. Thus, the plurality of fasteners 46 retain the panel's 12 material between the first and second parts 34,36 and additionally connect the two parts 34,36 together. Alternative and additional attachment solutions are contemplated without departing from the scope of the present invention, e.g., additional fasteners, adhesive, heat stake, integrally formed, J-lock retainer or any other kind of retainer(s), etc. and/or combinations thereof.

The upward edge of the panel portion 12 is connected to the soft top assembly 20 and/or vehicle, preferably, slidably connected in one embodiment. The panel portion 12 is provided with at least one upper or first attachment member shown generally at 48, e.g., a retainer. According to an embodiment of the present invention, at least one first carrier, such as a first channel, is provided on the soft top assembly 20 to receive and hold at least one metal or plastic first retainer 48 (e.g., a rod shaped, P-welt, etc retainer). This is a highly desirable and effective attachment method that is fast, easy, and is not complex—unlike conventional systems. Most preferably, the first retainer 48 is a P-welt. Typically, the first retainer 48 is operably sewn and/or bonded to the panel portion 12 material. Preferably, the first retainer 48 is sewn into a pocket formed in the soft material of the panel portion 12, most preferably, along the top of the quarter window assembly 10. The material containing the first retainer 48 can be the same or different as the outer show surface material of the panel 12. Once slid into place, the side of the cover 18 folds/flips down or is otherwise positioned over this area of attachment so that it is generally not visible in the installed position. The top deck 18 preferably incorporates deck side strips and valances, according to an embodiment of the present invention, such as deck side strips for attaching the quarter window panels and top deck edges fold downward to cover the attachment from view from the outside of the vehicle, and rear deck strips for attachment of the rear window panel and top deck or rear valance top deck folds down to cover the attachment.

Other shapes for the first retainer 48 are contemplated depending on the particular application without departure from the scope of the present invention, e.g., T-shaped, L-shaped, hook shaped, curved, etc. Alternatively, the first retainer 48 is provided under the top deck 20 flap and the corresponding first carrier is provided on the panel portion 12. Optionally, the first retainer 48 and/or channel has a stop on at least one end to center the rear quarter window assembly 10.

The front interior edge and bottom interior edge of the panel portion 12 has at least one front or second attachment member shown generally at 50, e.g., a retainer, and at least one bottom or third attachment member shown generally at 52, respectively, e.g., a retainer, that attach to flanges on the vehicle 2. The retainers 50,52 are sewn and/or bonded to the panel portion 12 material. The flanges are typically provided on the vehicle (e.g., original manufacturer component(s) or as add-on features). The second and third retainer 50,52 are typically trim lock, J-lock or window belt retainers. Preferably, the front flange is a door rail provided on the vehicle body in which the second retainer 50 is held. Preferably, the bottom flange is a belt rail provided on the vehicle body in which the third retainer 52 is held.

While there are specific types of retainers described throughout (e.g., 48, 50, 52), it is within the scope of this invention for other types and combinations of retainers or fasteners to be used in connection with all of the sides of the different portions of the quarter window assembly 12.

According to an embodiment of the present invention, at least one fourth retainer shown generally at 54, preferably, a J-hook, is provided on the interior of the assembly 12 for tighter fabric retention around the hard corner portion 16. Most preferably, the fourth retainer 54 is a J-hook extrusion that is sewn and/or bonded to the fabric window panel 12 and connects along the edge of the second part 36 of the hard corner portion 16. It is within the scope of this invention for other types and combinations of retainers or fasteners to be used.

First and second hard corner portions 16 and 16A include a vertical gap 56 to selectively connect vertical edges of the rear window assembly shown generally at 58 to the hard corner portions 16 and 16A. The rear window assembly 58 has a rear soft panel portion 60 provided with a rear window 62. Retainers on the inner surface of the rear panel portion 60 fit within the gap 56. A fifth retainer, e.g., located on the bottom inner surface edge, is selectively connected to the tailgate bar 22. Preferably, the fifth retain is a P-welt or a T-welt received in a rearward facing open carrier portion of the tailgate bar 22. A sixth retainer 66, e.g., located on the top inner surface edge of the panel 60, is provided to connect to the top deck 18. In a preferred embodiment, a carrier is provided on the top deck to receive the sixth retainer 66. Most preferably, the sixth retainer 64 is a P-welt received in a carrier, e.g., channel.

Providing at least one seal, e.g., rubber, foam, etc., to prevent water from entering the vehicle is contemplated without departing from the scope of the present invention. Preferably, rubber to prevent water permeation.

Alternatively, the first and second parts 34,36 of the hard corner portion 16 are steel, cast aluminum, or any other material to meet predetermined requirements contemplated without departing from the scope of the present invention. Preferably, the first and second parts 34,36 are lightweight injection molded plastic parts. Most preferably, the first and second parts 34,36 of the hard corner portion 16 are long glass filled polypropylene.

The rear bow 30 is steel, cast aluminum, molded plastic, or any other material to meet predetermined requirements contemplated without departing from the scope of the present invention, preferably, the rear bow 30—or at least the bow end bracket 32—is cast aluminum.

The top deck cover is operably configured to extend generally over the top edge of the rear window panel, in a preferred embodiment.

Incorporating a removable fabric rear window, upper fabric doors, full fabric doors, and/or any soft panel top cover assembly is contemplated without departing from the scope of the present invention.

The material of the panel portion 12 is any suitable material and type/style, such as twill, fabric, plurality of layers, foam, stretch, sail cloth, canvas, vinyl, multi-ply, flexible material, replaceable, rectangular, square, slanted (e.g., slant back rear window area), generally corresponding to the shape of the rearward soft top assembly and/or vehicle, etc, or combinations thereof, all of which are contemplated within the scope of the present invention.

The window 14 is any suitable material and type/style, such as plastic, glass, one-piece, plurality of pieces, fixed, openable (e.g., sliding window), tinted, clear, scratch resistant, tempered, non-tempered, heat-sealed, 40-mil heat sealed, replaceable, serviceable, removable rectangular, square, slanted (e.g., rear edge at a predetermined angle), generally corresponding to the shape/footprint of the panel, etc, or combinations thereof, all of which are contemplated within the scope of the present invention.

Incorporating alternative or additional quarter window assembly attachments to the vehicle is contemplated, e.g., zippers, J-hooks, fasteners, etc.

It is within the scope of the present invention that the hard corner portion 16 is installable on the vehicle without the panel portion 12.

The 2-door and 4-door descriptions described herein are not limiting. It is understood that any embodiment, and combinations thereof, described herein can be modified and is/are utilizable on any convertible, 2-door or 4-door vehicle, truck, SUV, etc.

It is understood that the left side quarter window assembly, including the hard corner portion 16A, is substantially a mirror-image of the right side 10,16 shown in FIGS. 1-11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A quarter window assembly for a vehicle, comprising;
at least one panel portion with at least one window, said at least one panel portion being made of a soft material and having an upper attachment member adapted to connect to a mating attachment member on a soft top cover; and
at least one hard corner support connected to the at least one panel portion, said hard corner support adapted to connect toward a rear of the vehicle to provide support and an attachment location for the at least one panel portion;
wherein the quarter window assembly additionally provides an attachment location for a rear window assembly; and wherein the quarter window assembly is selectively removable from the vehicle for maintenance, replacement, repair or when a more vehicle open air feel is desired.

2. The quarter window assembly of claim 1, wherein the hard corner support includes at least one locking feature adapted to engage a retention member connected to the vehicle to selectively locate one end of the hard corner support in position.

3. The quarter window assembly of claim 2, wherein the at least one locking feature is a tongue adapted to engage the retention member, wherein the retention member is integrally formed with or operably connected to the vehicle.

4. The quarter window assembly of claim 2, wherein the hard corner support further includes at least one attachment feature attachable to the vehicle to selectively locate the other end of the hard corner support in position.

5. The quarter window assembly of claim 4, wherein the hard corner support is connected substantially vertically at the rear corner of the vehicle.

6. The quarter window assembly of claim 5, wherein the at least one panel includes at least one retainer connected to the hard corner support for tight fabric retention around an outward surface of the hard corner support.

7. The quarter window assembly of claim 6, wherein the at least one retainer includes a plurality of fasteners to fasten the hard corner support to fabric of the at least one panel.

8. The quarter window assembly of claim 7, wherein part of the at least one panel wraps around an outward surface of the hard corner support and is attached to the hard corner support.

9. The quarter window assembly of claim 1, wherein a vertical edge of the rear window assembly is operably retained to said quarter window assembly, said rear window assembly is selectively removable from the quarter window assembly.

10. The quarter window assembly of claim 1, wherein the attachment member is a zipper adapted to interact with a mating zipper on a top deck of the soft top assembly.

11. The quarter window assembly of claim 1, wherein the at least one panel portion further comprises:
at least one bottom attachment member operably selectively connected to the vehicle; and
at least one front attachment member operably selectively connected to the vehicle.

12. A quarter window assembly for a vehicle, comprising;
at least one panel portion with at least one window, said at least one panel portion being made of a soft material and having an upper attachment member adapted to connect to a mating attachment member on a soft top cover; and
at least one hard corner support connected to the at least one panel portion, said hard corner support adapted to connect toward a rear of the vehicle to provide support and an attachment location for the at least one panel portion;
wherein the quarter window assembly is selectively removable from the vehicle for maintenance, replacement, repair or when a more vehicle open air feel is desired;
wherein the hard corner support includes at least one locking feature adapted to engage a retention member connected to the vehicle to selectively locate one end of the hard corner support in position; and
wherein the hard corner support further includes at least one attachment feature attachable to the vehicle to selectively locate the other end of the hard corner support in position.

13. A quarter window assembly for a vehicle, comprising;
at least one panel portion with at least one window, said at least one panel portion being made of a soft material and having an upper attachment member adapted to connect to a mating attachment member on a soft top cover; and
at least one hard corner support connected to the at least one panel portion, said hard corner support adapted to connect toward a rear of the vehicle to provide support and an attachment location for the at least one panel portion;
wherein the quarter window assembly is selectively removable from the vehicle for maintenance, replacement, repair or when a more vehicle open air feel is desired;
wherein the hard corner support includes at least one locking feature adapted to engage a retention member connected to the vehicle to selectively locate one end of the hard corner support in position; and
wherein the at least one locking feature is a tongue adapted to engage the retention member, wherein the retention member is integrally formed with or operably connected to the vehicle.

* * * * *